(12) United States Patent
Gitnes et al.

(10) Patent No.: US 12,203,532 B2
(45) Date of Patent: Jan. 21, 2025

(54) TORSIONALLY COMPLIANT ACTUATOR END STOP

(71) Applicant: Moog Inc., East Aurora, NY (US)

(72) Inventors: Seth E. Gitnes, Snohomish, WA (US); Ming chih Weng, Los Angeles, CA (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 18/288,357

(22) PCT Filed: Apr. 27, 2022

(86) PCT No.: PCT/US2022/026521
§ 371 (c)(1),
(2) Date: Oct. 25, 2023

(87) PCT Pub. No.: WO2022/232260
PCT Pub. Date: Nov. 3, 2022

(65) Prior Publication Data
US 2024/0218918 A1 Jul. 4, 2024

Related U.S. Application Data

(60) Provisional application No. 63/180,909, filed on Apr. 28, 2021.

(51) Int. Cl.
*F16H 25/20* (2006.01)
*F16H 25/22* (2006.01)

(52) U.S. Cl.
CPC ..... *F16H 25/2015* (2013.01); *F16H 25/2204* (2013.01)

(58) Field of Classification Search
CPC .. F16H 25/20; F16H 25/2015; F16H 25/2204; F16H 25/2454
See application file for complete search history.

(56) References Cited

U.S. PATENT DOCUMENTS 3,766,798 A 10/1973 Kusiak
4,266,437 A 5/1981 Obergfell
(Continued)

FOREIGN PATENT DOCUMENTS

| CN | 102889352 A | 1/2013 |
| DE | 102012210226 A1 | 12/2013 |
| KR | 20170101720 A | 9/2017 |

OTHER PUBLICATIONS

McMaster-Carr, Metric Clamping Acme Lead Screw Collars, Retrieved on Mar. 29, 2021 from https://www.mcmaster.com/screw-actuators/metric-clamping-acme-lead-screw-collars/2021.

*Primary Examiner* — Joseph Brown
(74) *Attorney, Agent, or Firm* — Harter Secrest & Emery LLP

(57) ABSTRACT

A linear actuator comprising a shaft and a nut that translates within a linear range of motion in response to relative rotation between the nut and shaft, a stop positioned at a travel limiting position and having an inner portion connected to the shaft, a radially compliant outer portion axially overlapping the inner portion and configured to rotate relative to the inner portion, and a cam roller portion disposed radially between the inner and outer portions and configured to move relative to a neutral orientation in response to relative rotation between the inner and outer portions, and the outer portion configured to radially bias the cam roller portion towards the neutral orientation; wherein rotation of the outer portion caused by the nut rotating into the outer portion provides an outward radial load at the cam roller portion on the outer portion that is absorbed by the outer portion.

10 Claims, 6 Drawing Sheets

(56) References Cited

U.S. PATENT DOCUMENTS

| | | | |
|---|---|---|---|
| 4,295,384 A | 10/1981 | Brandt et al. | |
| 5,088,339 A | 2/1992 | Lochmoeller | |
| 8,109,165 B2 | 2/2012 | Himmelmann | |
| 9,103,422 B2 | 8/2015 | Wingett et al. | |
| 9,182,022 B2 | 11/2015 | Wingett et al. | |
| 9,651,126 B2 * | 5/2017 | Lang | F16H 25/2454 |
| 10,215,264 B2 | 2/2019 | Ungar et al. | |
| 2014/0305238 A1 | 10/2014 | Wingett et al. | |
| 2017/0158313 A1 | 6/2017 | Tilloy et al. | |

* cited by examiner

TORSIONALLY COMPLIANT ACTUATOR END STOP

TECHNICAL FIELD

The present invention relates generally to the field of ball screw actuators, and more specifically to an actuator having an improved shock absorbing end stop.

BACKGROUND ART

Ball screw actuators are well known in the art and generally include a screw in threaded engagement with a nut and driven by a motor. Relative rotation between the screw and the nut produces axial displacement between the screw and the nut. This axial displacement typically drives a linear stroke of an actuating mechanism. In such systems, one or more end stops may be used to limit actuator travel at fully retracted and/or fully extended positions and limit damage to the motor, ball screw or mechanical connections.

U.S. Pat. No. 8,109,165 is directed to a compliant non-jamming end of travel stop for a ball screw actuator. The ball screw actuator includes a torsion spring that is operatively arranged to absorb energy when first and second stops of the ball screw actuator engage at a travel limiting position.

SUMMARY

With parenthetical reference to the corresponding parts, portions or surfaces of the disclosed embodiment, merely for the purposes of illustration and not by way of limitation, the present disclosure provides a linear actuator comprising: a shaft (16) orientated about a center axis (30); a nut (18) in engagement with the shaft (16) such that the nut (18) translates within a linear range of motion axially on the center axis (30) relative to the shaft in response to relative rotation between the nut (18) and the shaft (16) about the center axis (30); a stop (15) positioned at a travel limiting position of the range of motion between the shaft (16) and the nut (18); the stop (15) comprising an inner portion (21) constrained from rotating about the center axis (30) relative to the shaft, a radially compliant outer portion (23) axially overlapping the inner portion (21) and configured to rotate about the center axis (30) relative to the inner portion (21), and a cam roller portion (22) disposed radially between the inner portion (21) and the radially compliant outer portion (23); the cam roller portion (22) operatively configured to move relative to a neutral orientation with the inner portion (21) that correlates with the travel limiting position in response to relative rotation between the radially compliant outer portion (23) and the inner portion (21) about the center axis (30); and the radially compliant outer portion (23) configured to radially bias the cam roller portion (22) towards the neutral orientation; wherein rotation of the radially compliant outer portion (23) relative to the inner portion (21) caused by the nut (18) rotating into the radially compliant outer portion (23) of the stop (15) provides an outward radial load at the cam roller portion (22) on the radially compliant outer portion (23) that is absorbed by the radially compliant outer portion (23).

The shaft may comprise an outer ball track (43) and the nut (18) may comprise an inner ball track (44) and the linear actuator may comprise a plurality of balls (45) disposed in the outer ball track (43) and the inner ball track (44). The inner portion (21) may be constrained from translating axially on the center axis (30) relative to the shaft (16). The linear actuator may comprise an axially compliant member (19) between the inner portion (21) and the radially compliant outer portion (23) configured to bias the radially compliant outer portion (23) axially on the center axis (30) towards the travel limiting position. The axially compliant member may comprise a spring (19) acting between the inner portion (21) and the radially compliant outer portion (23).

The inner portion may comprise an end stop ring (21) connected to the shaft (16); the radially compliant outer portion may comprise a compliant cam sleeve (23); at least one of the end stop ring (21) and the compliant cam sleeve (23) may have at least one sloped cam surface (33, 34); the cam roller portion may comprise at least one roller (22) orientated radially between the end stop ring (21) and the compliant cam sleeve (23) and in rolling engagement with the sloped cam surface (33, 34) from the neutral orientation correlating to the travel limiting position; and movement of the at least one roller (22) from the neutral orientation may provide an outward radial load at the at least one roller (22) on the compliant cam sleeve (23) that is absorbed by the complaint cam sleeve (23). The end stop ring (21) may comprise the at least one sloped cam surface (33, 34). The end stop ring (21) may comprise a plurality of the sloped cam surfaces (34a, 34b, 34c, 34d, 34e, 33a, 33b, 33c, 33d, 33e) and the cam roller portion may comprise a plurality of rollers (22a, 22b, 22c, 22d, 22e) orientated radially between the end stop ring (21) and the compliant cam sleeve (23) and each of the rollers (22a, 22b, 22c, 22d, 22e) may be in rolling engagement with a corresponding one of the plurality of sloped cam surfaces (34a, 34b, 34c, 34d, 34e, 33a, 33b, 33c, 33d, 33e) from the neutral orientation correlating to the travel limiting position.

The nut (18) may comprise a torsional input stop (26) and the complaint cam sleeve (23) may comprise a torsional output stop (25) configured such that the complaint cam sleeve (23) rotates in a first direction about the center axis (30) relative to the shaft (16) with rotation of the nut (18) in the first direction about the center axis (30) relative to the shaft (16) when the torsional output stop (25) and the torsional input stop (26) axially overlap and rotationally abut, and rotation of the compliant cam sleeve (23) relative to the end stop ring (21) caused by the torsional input stop (26) of the nut (18) rotating into the torsional output stop (25) of the compliant cam sleeve (23) provides the outward radial load at each of the rollers (22a, 22b, 22c, 22d, 22e) on the compliant cam sleeve (23) that is absorbed by the complaint cam sleeve (23). The nut (18) may comprise a torsional input stop (26) and the radially compliant outer portion (23) of the stop (15) may comprise a torsional output stop (25) configured such that the radially compliant outer portion (23) of the stop (15) rotates in a first direction about the center axis (30) relative to the shaft (16) with rotation of the nut (18) in the first direction about the center axis (30) relative to the shaft (16) when the torsional output stop (25) and the torsional input stop (26) axially overlap and rotationally abut, and rotation of the radially compliant outer portion (23) of the stop (15) relative to the inner portion (21) of the stop (15) caused by the torsional input stop (26) of the nut (18) rotating into the torsional output stop (25) of the radially compliant outer portion (23) of the stop (15) provides the outward radial load at the cam roller portion (22) on the radially compliant outer portion (23) of the stop (15) that is absorbed by the radially compliant outer portion (23) of the stop (15).

DETAILED DESCRIPTION OF THE EMBODIMENTS

Figure 1:
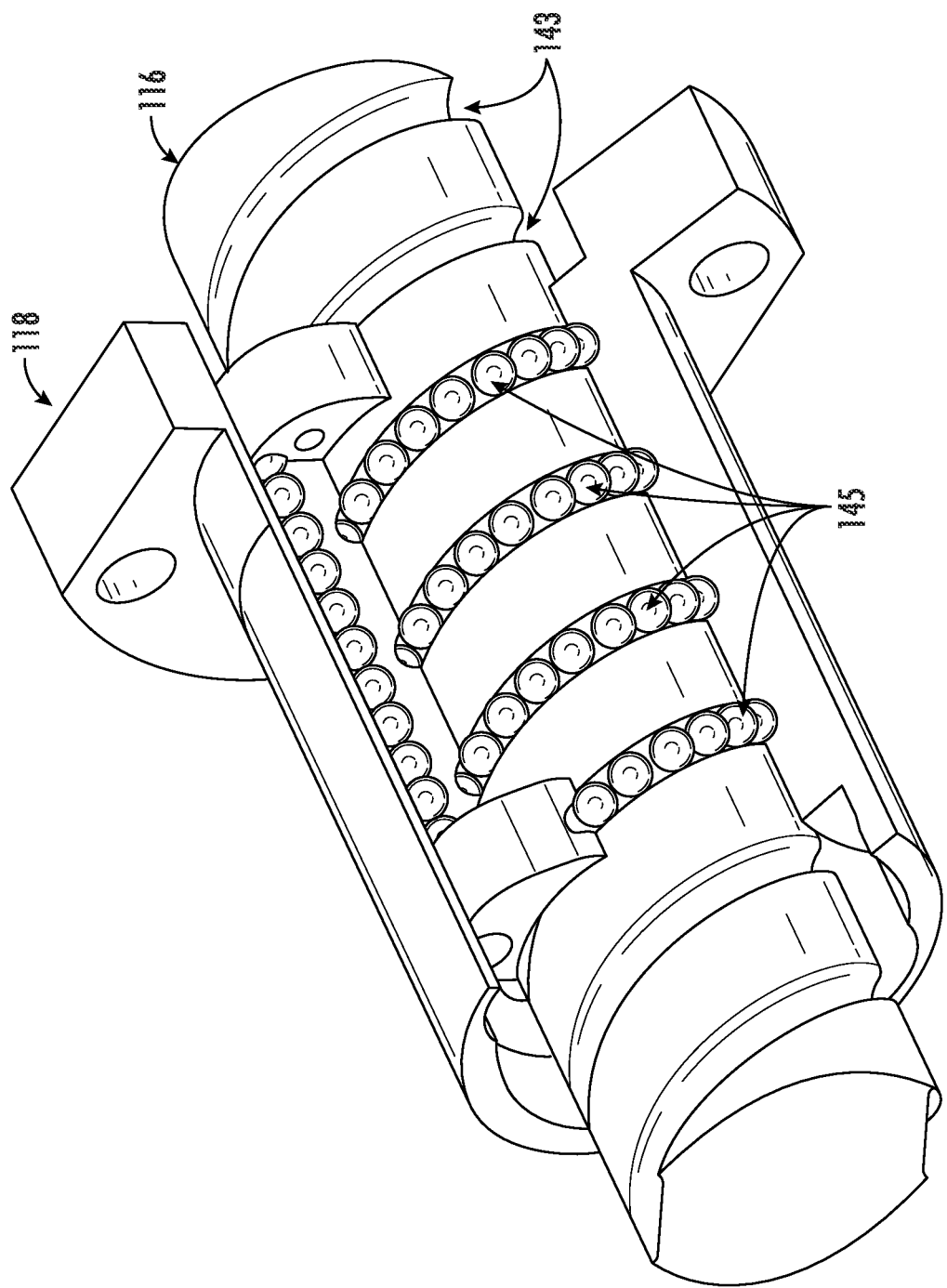
FIG. 1 is perspective partial cut-away view of a ball screw assembly known in the prior art.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

FIG. 1 shows a type of ball screw assembly known in the prior art. As shown, the ball screw assembly uses the rolling motion of balls 145 positioned between a shaft 116 and a nut 118 to produce relative motion between the shaft 116 and the nut 118. The ball bearing assembly 118 acts as the nut while the threaded shaft 116 provides a helical raceway 143 for ball bearings 145. The ball screw assembly may thereby be operated as a mechanical linear actuator that translates rotational motion to linear motion with reduced friction.

Figure 2:
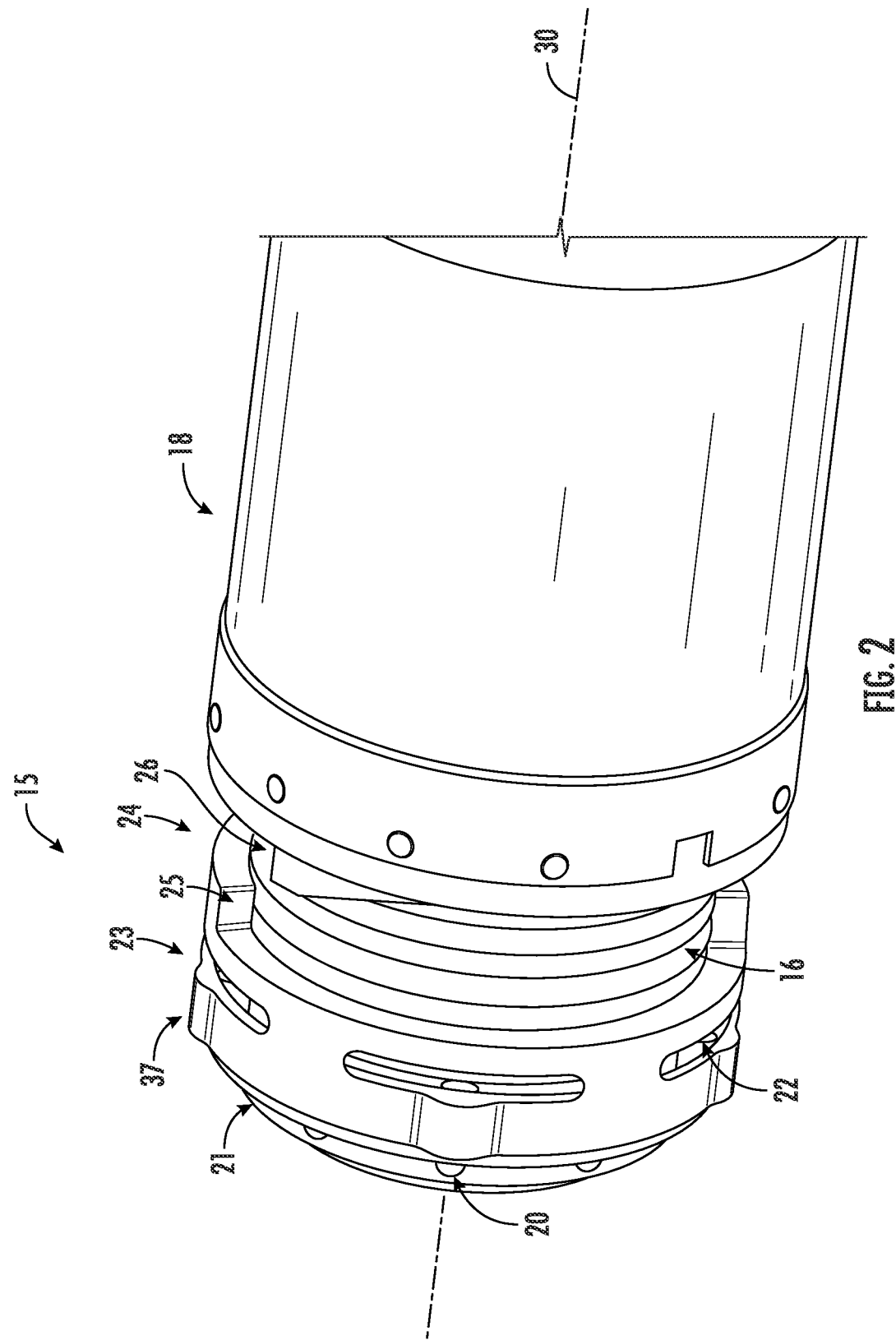
FIG. 2 is a perspective view of a first embodiment of an improved ball screw end stop assembly.
Figure 3:
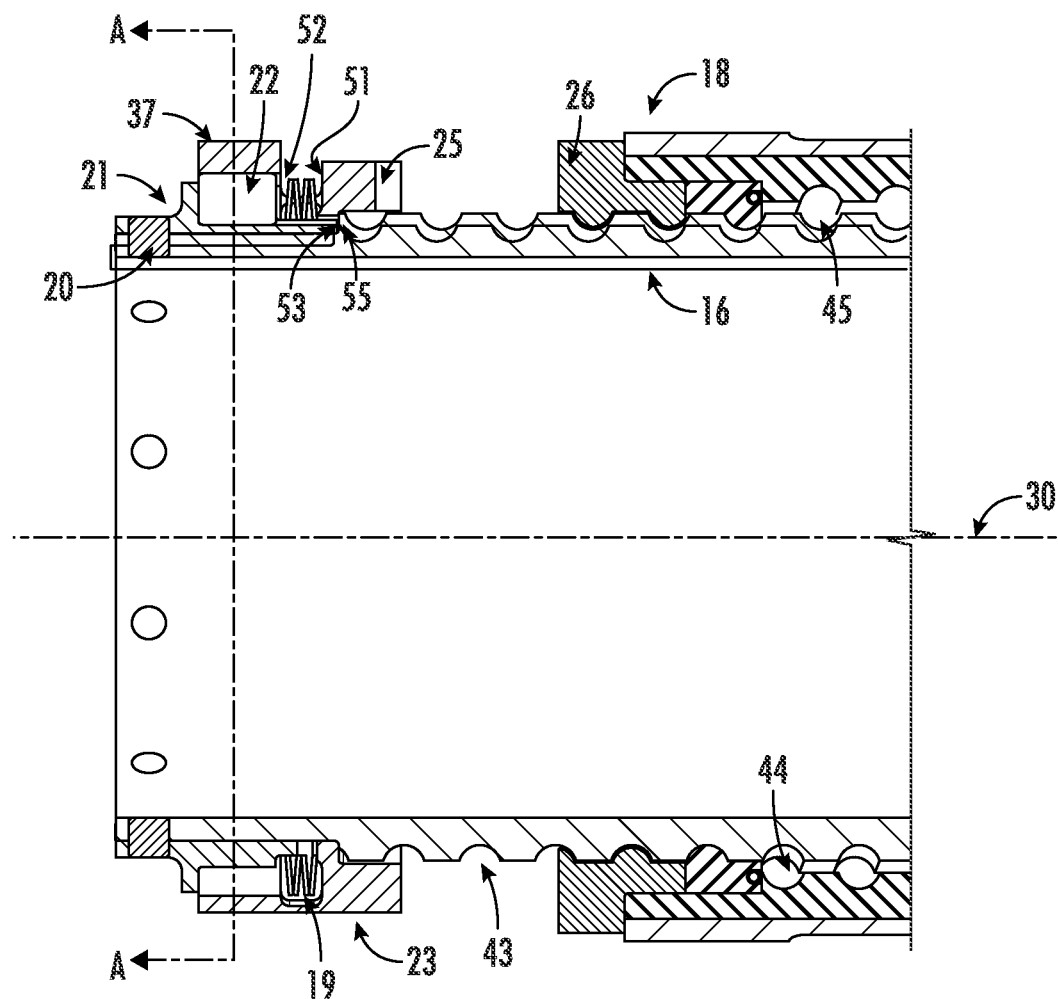
FIG. 3 is a longitudinal vertical cross-sectional view of the ball screw end stop assembly shown in FIG. 2.

With reference to FIGS. 2 and 3, an improved ball screw end stop assembly is provided, a first embodiment of which is generally indicated at 15. As shown, end stop assembly 15 generally includes ball screw shaft 16 oriented about axis 30, ball screw nut 18 in rotational engagement with ball screw shaft 16, end stop ring 21 orientated about axis 30 and fixed to ball screw shaft 16, compliant cam sleeve 23 orientated about axis 30, rollers 22 positioned radially between end stop ring 21 and compliant cam sleeve 23, and spring 19 orientated around ball screw shaft 16 between end stop ring 21 and compliant cam sleeve 23. Shock absorbing end stop 15 provides a rotational stop at the end of the desired axial travel of nut 18 relative to ball screw shaft 16 that reduces both the axial load on shaft 16 of ball screw assembly 15 and the torsional load on the nut 18 and shaft 16 interface of ball screw assembly 15.

As shown, end stop ring 21 is orientated about axis 30 and is coaxial with shaft 16. End stop ring 30 is fixedly connected to shaft 16 by circumferentially spaced fasteners 20 that interface with corresponding openings on the outside surface of the end of shaft 16. As a result, end stop ring 21 is constrained and not free to rotate about shaft 16 and axis 30 and is also constrained and not free to translate axially along axis 30 relative to shaft 16.

As shown, ball screw 16 includes helical track 43 and nut 18 includes opposed track 44, with ball bearings 45 therebetween. As shown, the left side of nut 18 includes first face 26 of torsional dog stop 24 and the right side of compliant cam sleeve 23 includes second face 25 of torsional dog stop 24 that is configured to mate with first face 26 of torsional dog stop 24 on nut 18. Accordingly, when the respective mating faces 25 and 26 of torsional dog stop 24 are rotated such that they axially overlap and rotationally oppose each other and come into contact, the torque and rotation of nut 18 about axis 16 is transferred to compliant cam sleeve 23. Compliant cam sleeve 23 is rotatable about the end of shaft 16 and axis 30, so that compliant cam sleeve 23 rotates about axis 30 with rotation of nut 18 about axis 30 on shaft 16 when in mating engagement via torsional dog stop 24. Compliant cam sleeve 23 is coaxial with and free to rotate about shaft 16 relative to end stop ring 21 while end stop ring 21 on shaft 16 is not free to rotate about shaft 16. When dog-stop face 26 of nut 18 rotates to the left until it engages dog-stop face 25 of compliant cam sleeve 23, compliant cam sleeve 23 begins to rotate with nut 18 about shaft 16 and relative to end stop ring 21 fixed to shaft 16.

Figure 4:
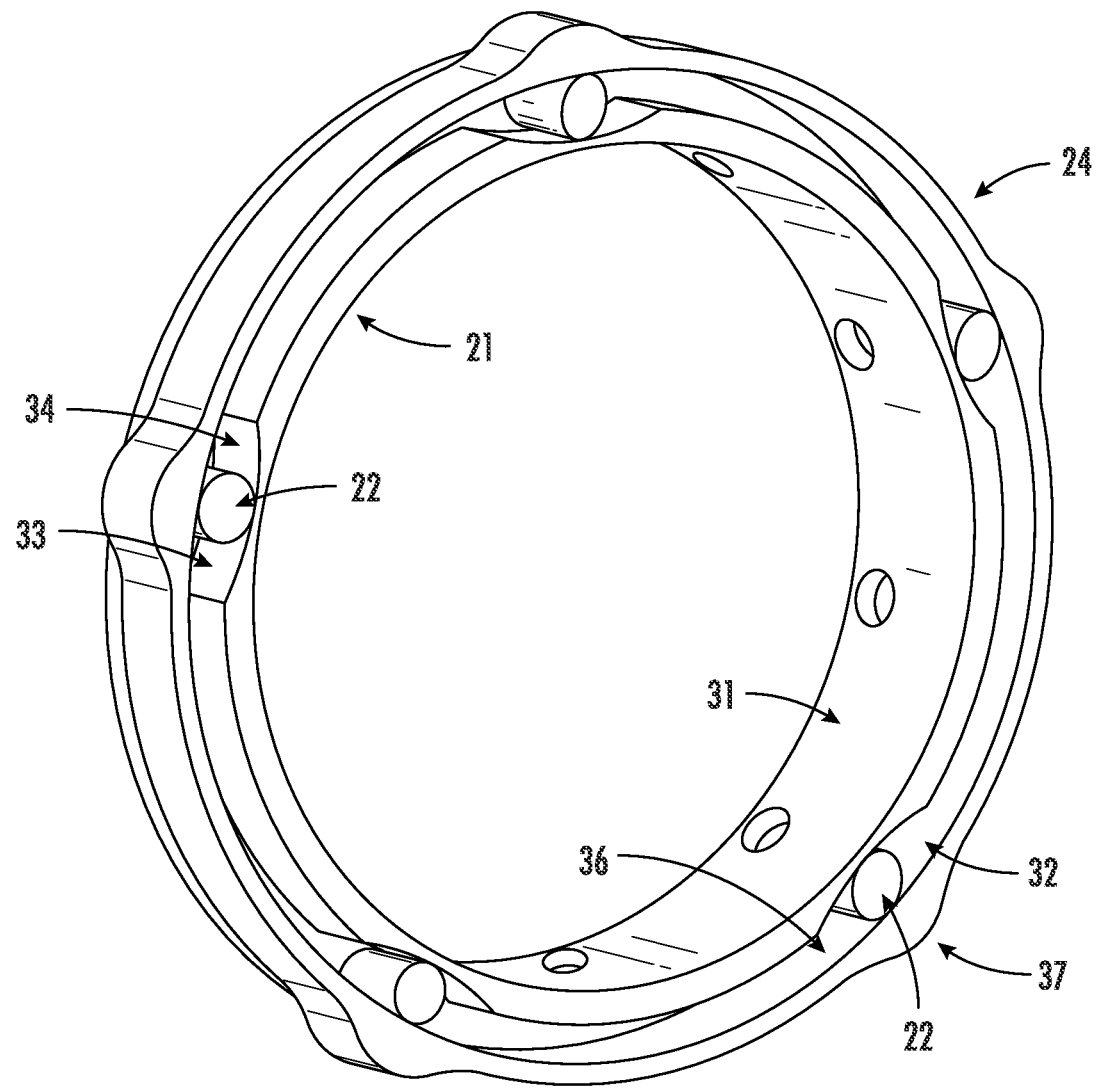
FIG. 4 is a perspective view of a portion of the ball screw end stop assembly shown in FIG. 2.
Figure 5:
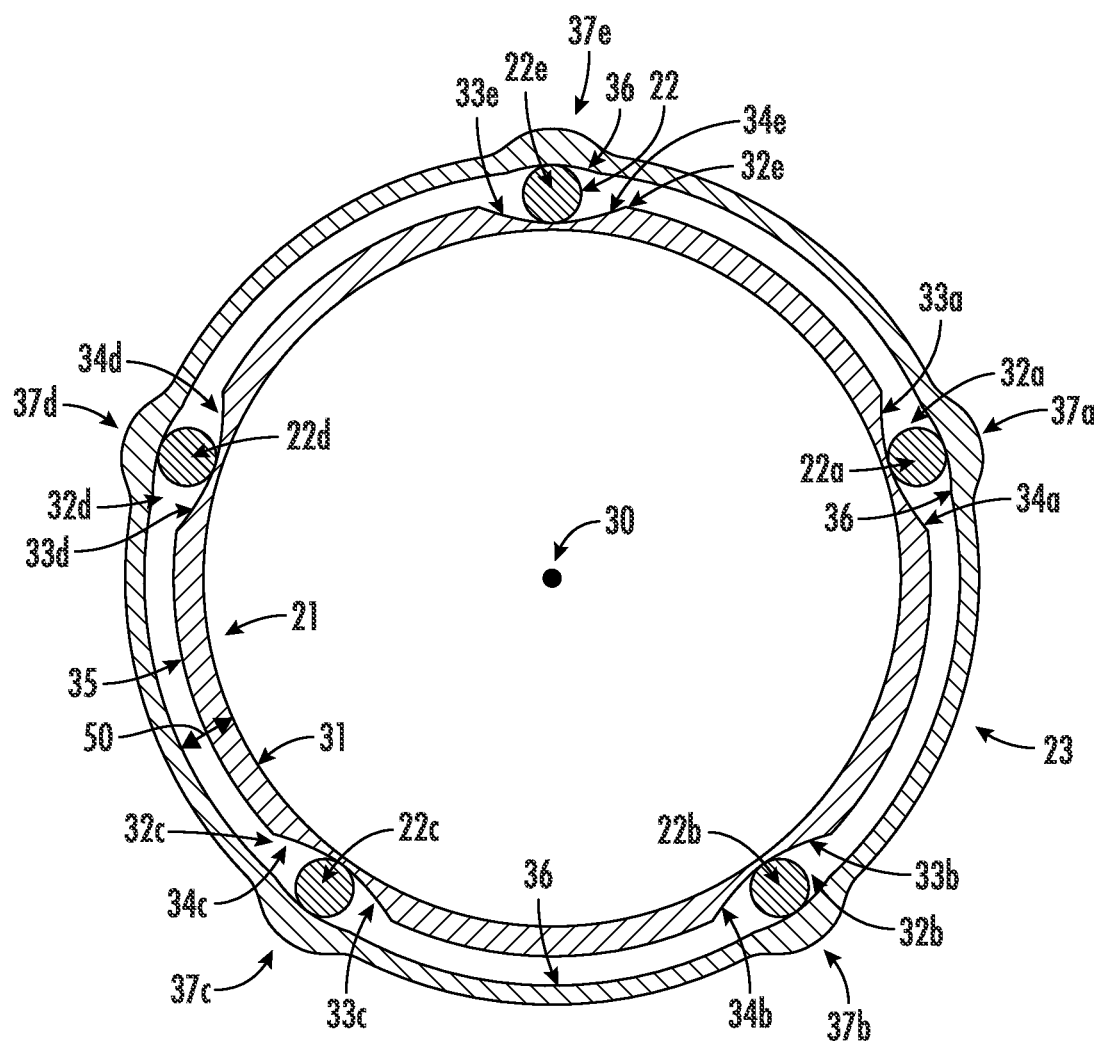
FIG. 5 is a transverse vertical cross-sectional view of the ball screw end stop assembly shown in FIG. 3, taken generally on line A-A of FIG. 3.
Figure 6:
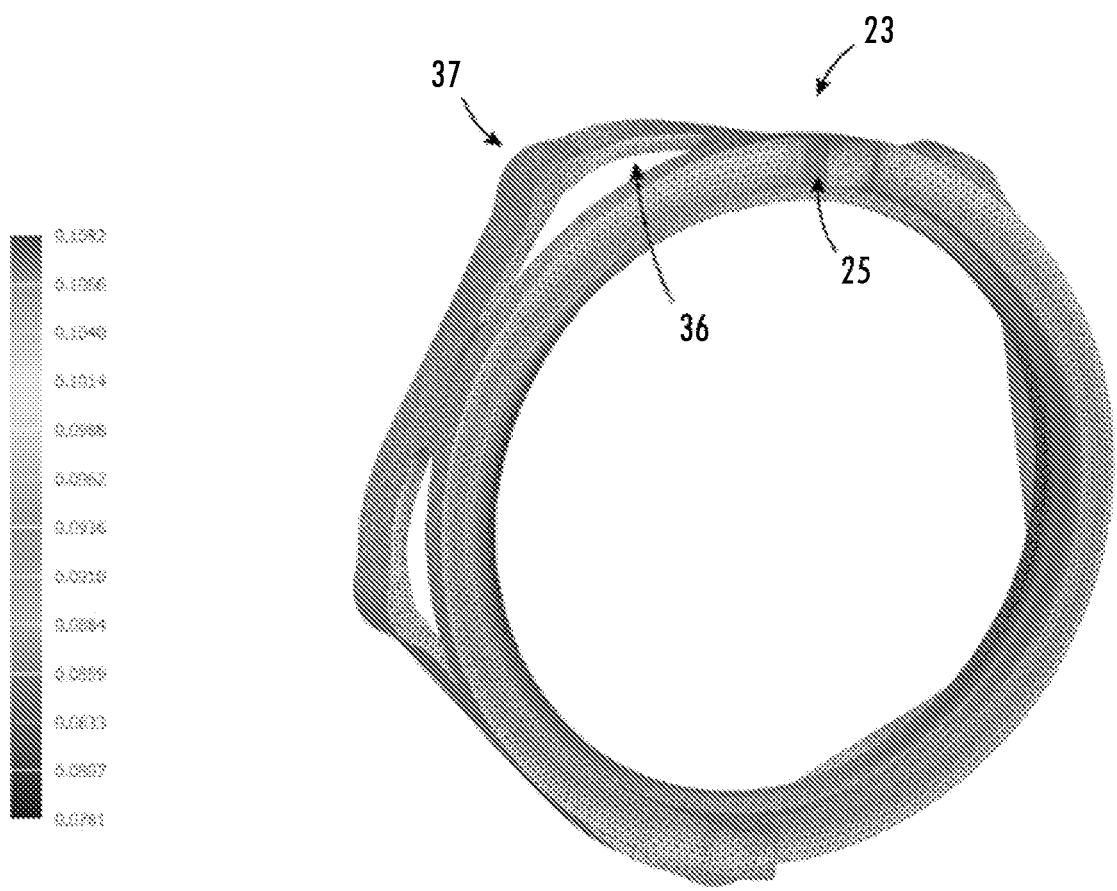
FIG. 6 is a finite element analysis of the compliant cam sleeve shown in FIG. 2 under an applied outward radial load.

As shown in FIGS. 4 and 5, the inner end stop ring 21 includes a plurality of circumferentially spaced apart outwardly-facing and longitudinally-extending cam surfaces or roller pockets 32. In this embodiment, five cam pockets 32a, 32b, 32c, 32d and 32e are equally spaced circumferentially about axis 30. Each of roller pockets 32 comprises a pair of outwardly-facing and longitudinally-extending oppositesloped ramped or inclined surfaces 33 and 34. In this embodiment, cam pocket 32a is defined by cam surfaces 33a and 34a, cam pocket 32b is defined by cam surfaces 33b and 34b, cam pocket 32c is defined by cam surfaces 33c and 34c, cam pocket 32d is defined by cam surfaces 33d and 34d, and cam pocket 32e is defined by cam surfaces 33e and 34e. A plurality of longitudinally extending cylindrical rollers 22 are disposed radially between inner cylindrical surface 36 of outer compliant cam sleeve 23 and each of circumferentially-spaced apart outwardly-facing sloped cam surface pockets 32 of end stop ring 21. Rollers 22a, 22b, 22c, 22d and 22e are show in FIG. 5 in a neutral orientation such that the radial gap 50 between inwardly-facing cylindrical surface 31 of the inner end stop ring 21 and inwardly-facing cylindrical surface 36 of the outer cam sleeve 23 is at minimum, with each of rollers 22a, 22b, 22c, 22d and 22e positioned at the bottom of each of pockets 32a, 32b, 32c, 32d and 32e, respectively. When outer compliant cam sleeve 23 is rotated about shaft 16 relative to inner end stop ring 21 by ball screw nut 18 rotating into torsional dog stop 24, the relative rotation of inner cylindrical surface 36 of outer compliant cam sleeve 23 and sloped cam surfaces 33 or 34 of inner end stop ring 21, with rollers 22 compressed between them, causes rollers 22 to roll from the bottom of pockets 32 up surfaces 34, respectively, and thereby provides an outward radial load at each roller 22 on compliant cam sleeve 23. Such radial load is then absorbed by outer complaint cam sleeve 23.

Outer complaint cam sleeve 23 is designed to absorb the resulting load, similar to a torsional spring, by elastic deflection or deformation. As shown, in this embodiment outer cam sleeve 23 includes thickened portions 37 circumferentially aligned about axis 30 with rollers 22 to help absorb the load on deflection or deformation, with thickened portion 37a circumferentially aligned with roller 22a, thickened portion 37b circumferentially aligned with roller 22b, thickened portion 37c circumferentially aligned with roller 22c, thickened portion 37d circumferentially aligned with roller 22d, and thickened portion 37e circumferentially aligned with roller 22e. Thus, when outer complaint cam sleeve 23 begins to rotate relative to inner end stop ring 21, it causes rollers 22 to roll up or down the ramps or inclined surfaces 33 or 34, depending on the direction of rotation, of inner end stop ring 21. When sleeve 23 is rotated by nut 18 moving to the left into stop 24, the relative rotation between opposed cam surface 36 of sleeve 23 and cam surface 34 of end stop ring 21 with rollers 22 therebetween forces the cam surfaces to radially separate and increase radial gap 50 based on the angle of surfaces 34 of roller ramp pockets 32. The resulting deflection or deformation of complaint cam sleeve 23, including in thickened absorbing sleeve portions 37, produces the torsional compliance necessary to absorb the kinetic energy of the system, preventing excessive torque spikes from occurring in the gear train of the actuator.

FIG. 5 shows modeled finite element analysis results of outer complaint cam sleeve 23 deflected after impact (note the deflections are exaggerated). Thus, end stop assembly 15 includes cam surfaces 33 and 34 and rollers 22 that convert the rotary motion and torsional load of dog stop 24 into a radial load, which is then applied to outer compliant cam sleeve 23 to absorb the energy of the impact.

Accordingly, torsional stop face 26 on nut 18 of the ball screw may be rotated so as to move to the left until it engages dog stop face 25 on complaint cam sleeve 23. At this point, complaint cam sleeve 23 begins to rotate with nut 18 of the ball screw about shaft 16 and axis 30. However, end stop ring 21 is connected to shaft 16 of the ball screw so it cannot rotate. The relative rotation between outer complaint cam sleeve 23 and inner end stop ring 21, with rollers 22 compressed between them, causes rollers 22 to roll from the bottom of pockets 32 up surfaces 34, respectively. This in turn forces inner surface 36 of outer complaint cam sleeve 23 to radially separate from inner end stop ring 21 and radial gap 50 to widen based on the angle of cam surfaces 34 of roller pockets 32 in inner end stop ring 21, thereby converting at least a part of the end stop impact to a radial load on sleeve 23. Elastic outer complaint cam sleeve 23, including thickened absorbing sleeve portions 37, absorbs the kinetic energy of the end stop impact with elastic deformation, preventing excessive torque spikes from occurring in the gear train of the actuator. When the torsional load of nut 18 is removed, rollers 22 roll back down surfaces 34 of end stop ring 21 to the bottom of pockets 32 in end stop ring 21, respectively, and thereby return to their neutral orientation between end stop ring 21 and radially compliant cam sleeve 23.

As shown in FIG. 3, in this embodiment end stop 15 also includes force-absorbing spring 19. Spring 19 is disposed in an axial gap between leftwardly-facing annular vertical surface 51 of cam sleeve 23 and opposed rightwardly-facing vertical annular surface 52 of end stop ring 21. When cam sleeve 23 is contacted by nut 18 moving to the left, a portion of the resulting axial load 27 may be absorbed by spring 19 acting between annular retaining surface 52 of end stop ring 21 and opposed annular surface 51 of sleeve 23. Spring 19 biases cam sleeve 23 axially to the right against leftwardly-facing vertical annular retaining surface 53 of shoulder 55 in shaft 16. Spring 19 thereby acts as an axial shock absorber with respect to an axial load and also biases sleeve 23 and in turn rollers 22 to their neutral orientation when the torsional load of nut 18 is removed from cam sleeve 23. Various types of springs or other energy absorbing alternatives may be used. For example, and without limitation, a coil spring, a Belleville washer or disc spring stack, an elastomeric spring, or a hydraulic damper may be employed.

Thus, ball screw end stop assembly 15 includes radially compliant cam sleeve 23 between torsional dog stops 24 and end stop ring 21 that converts rotary motion and torsional load of torsional dog stops 24 into a radial load which is applied to complaint sleeve 23 to absorb the energy of the impact. Any axial loads developed by assembly 15 are isolated from the ball bearings 45 in nut 18 of the ball screw assembly by annular retaining shoulder 55 in shaft 16, which prevents axial movement of sleeve 23 to the right. Thus, fatigue damage is not introduced into the ball screw assembly.

Ball screw end stop assembly 15 may be arranged to act, for example, and without limitation, between an airfoil surface and a fuselage of an aircraft to adjust the orientation of the airfoil surface relative to the fuselage. A motor drives relative rotation between ball screw 16 and ball nut 18 to cause axially-directed relative motion between ball screw 16 and ball nut 18. By way of non-limiting example, the motor may be an electric motor or a hydraulic motor.

Ball screw end stop assembly 15 protects the ball screw from axial loads developed by contacting end stop ring 21 and absorbs the torsional kinetic energy of the drive motor in the actuator. Ball screw end stop assembly 15 provides a rotational stop at the end of travel of the ball screw that prevents additional axial load from being developed by the lead or shaft of the ball screw through torsional dog tooth stop 24. Ball screw end stop assembly 15 thus provides a number of benefits over the prior art. For example, even if the subject actuator is equipped with a high speed hydraulic or electric motor, the kinetic energy of the driving motor can be adequately absorbed by assembly 15 and without a torque spike resulting from a full speed impact into the torsional dog tooth stops damaging the gear train or requiring a much heavier design to accommodate the loads. Also, if the stops are impacted frequently, particularly on a telescoping ball screw wherein the intermediate ball screw stops are impacted every operation, assembly 15 reduces fatigue issues for the ball screw and drive train components.

Several additions modifications can be made to the disclosed embodiments. For example, and without limitation, surfaces 33 and 34 and pockets 32 of end stop ring 21 and surface 36 of sleeve 23 may have alternative relative configurations, angles, and cam surfaces to provide a desired range and rate of radial separation depending on the application. Also, alternative shaft thread configurations or profiles and helical raceways between the ball shaft and nut may be employed as well as different ball return systems. As yet another alternative, a lead screw and nut may be employed without ball bearings.

Therefore, while a form of the ball screw end stop assembly has been shown and described, and several modifications discussed, persons skilled in this art will readily appreciate that various additional changes may be made without departing from the scope of the invention.

What is claimed is:

1. A linear actuator comprising:
    a shaft orientated about a center axis;
    a nut in engagement with said shaft such that said nut translates within a linear range of motion axially on said center axis relative to said shaft in response to relative rotation between said nut and said shaft about said center axis;
    a stop positioned at a travel limiting position of said range of motion between said shaft and said nut;
    said stop comprising an inner portion constrained from rotating about said center axis relative to said shaft, a radially compliant outer portion axially overlapping said inner portion and configured to rotate about said center axis relative to said inner portion, and a cam roller portion disposed radially between said inner portion and said radially compliant outer portion;

said cam roller portion operatively configured to move relative to a neutral orientation with said inner portion that correlates with said travel limiting position in response to relative rotation between said radially compliant outer portion and said inner portion about said center axis; and said radially compliant outer portion configured to radially bias said cam roller portion towards said neutral orientation;

wherein rotation of said radially compliant outer portion relative to said inner portion caused by said nut rotating into said radially compliant outer portion of said stop provides an outward radial load at said cam roller portion on said radially compliant outer portion that is absorbed by said radially compliant outer portion.

2. The linear actuator set forth in claim 1, wherein said shaft comprises an outer ball track and said nut comprises an inner ball track and comprising a plurality of balls disposed in said outer ball track and said inner ball track.

3. The linear actuator set forth in claim 1, wherein said inner portion is constrained from translating axially on said center axis relative to said shaft.

4. The linear actuator set forth in claim 1, comprising an axially compliant member between said inner portion and said radially compliant outer portion configured to bias said radially compliant outer portion axially on said center axis towards said travel limiting position.

5. The linear actuator set forth in claim 4, wherein said axially compliant member comprises a spring acting between said inner portion and said radially compliant outer portion.

6. The linear actuator set forth in claim 1, wherein:

said inner portion comprises an end stop ring connected to said shaft;

said radially compliant outer portion comprises a compliant cam sleeve;

at least one of said end stop ring and said compliant cam sleeve has at least one sloped cam surface;

said cam roller portion comprises at least one roller orientated radially between said end stop ring and said compliant cam sleeve and in rolling engagement with said sloped cam surface from said neutral orientation correlating to said travel limiting position; and movement of said at least one roller from said neutral orientation provides an outward radial load at said at least one roller on said compliant cam sleeve that is absorbed by said complaint cam sleeve.

7. The linear actuator set forth in claim 6, wherein said end stop ring comprises said at least one sloped cam surface.

8. The linear actuator set forth in claim 7, wherein said end stop ring comprises a plurality of said sloped cam surfaces and said cam roller portion comprises a plurality of rollers orientated radially between said end stop ring and said compliant cam sleeve and each of said rollers is in rolling engagement with a corresponding one of said plurality of sloped cam surfaces from said neutral orientation correlating to said travel limiting position.

9. The linear actuator set forth in claim 8, wherein said nut comprises a torsional input stop and said complaint cam sleeve comprises a torsional output stop configured such that said complaint cam sleeve rotates in a first direction about said center axis relative to said shaft with rotation of said nut in a first direction about said center axis relative to said shaft when said torsional output stop and said torsional input stop axially overlap and rotationally abut, and rotation of said compliant cam sleeve relative to said end stop ring caused by said torsional input stop of said nut rotating into said torsional output stop of said compliant cam sleeve provides said outward radial load at each of said rollers on said compliant cam sleeve that is absorbed by said complaint cam sleeve.

10. The linear actuator set forth in claim 1, wherein said nut comprises a torsional input stop and said radially compliant outer portion of said stop comprises a torsional output stop configured such that said radially compliant outer portion of said stop rotates in a first direction about said center axis relative to said shaft with rotation of said nut in a first direction about said center axis relative to said shaft when said torsional output stop and said torsional input stop axially overlap and rotationally abut, and rotation of said radially compliant outer portion of said stop relative to said inner portion of said stop caused by said torsional input stop of said nut rotating into said torsional output stop of said radially compliant outer portion of said stop provides said outward radial load at said cam roller portion on said radially compliant outer portion of said stop that is absorbed by said radially compliant outer portion of said stop.

* * * * *